(12) United States Patent
Wang

(10) Patent No.: US 9,240,031 B1
(45) Date of Patent: Jan. 19, 2016

(54) PANEL SELF REFRESHING WITH CHANGING DYNAMIC REFRESH RATE

(71) Applicant: Analogix Semiconductor, Inc., Santa Clara, CA (US)

(72) Inventor: Xin Wang, Beijing (CN)

(73) Assignee: Analogix Semiconductor, Inc., Santa Clara, CA (US)

( * ) Notice: Subject to any disclaimer, the term of this patent is extended or adjusted under 35 U.S.C. 154(b) by 0 days.

(21) Appl. No.: 14/505,406

(22) Filed: Oct. 2, 2014

Related U.S. Application Data

(63) Continuation of application No. 13/594,548, filed on Aug. 24, 2012, now Pat. No. 8,884,977.

(51) Int. Cl.
| | |
|---|---|
| *G09G 5/36* | (2006.01) |
| *G06F 15/00* | (2006.01) |
| *G06T 1/00* | (2006.01) |
| *G06T 1/60* | (2006.01) |
| *G09G 5/18* | (2006.01) |
| *G09G 5/00* | (2006.01) |

(52) U.S. Cl.
CPC .. *G06T 1/60* (2013.01); *G09G 5/00* (2013.01); *G09G 5/18* (2013.01)

(58) Field of Classification Search
CPC ........... G06T 1/00–1/0092; G06T 1/60; G06T 15/00–15/005; G06F 15/00; G09G 5/36–5/366

USPC .................................. 345/501, 522, 530, 545
See application file for complete search history.

(56) References Cited

U.S. PATENT DOCUMENTS

| | | | |
|---|---|---|---|
| 2006/0146056 A1* | 7/2006 | Wyatt ............................ | 345/501 |
| 2008/0001934 A1* | 1/2008 | Wyatt ............................ | 345/204 |
| 2009/0160841 A1* | 6/2009 | Fletcher et al. ............... | 345/211 |
| 2012/0147020 A1* | 6/2012 | Hussain et al. ............... | 345/522 |
| 2013/0021352 A1* | 1/2013 | Wyatt et al. ................... | 345/520 |

* cited by examiner

*Primary Examiner* — Jacinta M Crawford
(74) *Attorney, Agent, or Firm* — Carr & Ferrell LLP

(57) ABSTRACT

Provided are methods and systems for video data processing. In an exemplary system, there is a video source and a display unit. The display unit may receive video data from the video source and display it at a first refresh rate. The video source may cause the display unit to enter a power economy mode, in which the displayed video is static. In this mode, the video source stops sending new video data, while the display unit selectively stores one or more of the previously received video frames and further displays it repeatedly at a second refresh rate, which may be lower than the first refresh rate (e.g., it may be decreased from 60 Hz to 40 Hz). In the power economy mode, the power consumed is decreased, in some embodiments, by about 10-20% for both the video source and the display unit.

19 Claims, 4 Drawing Sheets

PANEL SELF REFRESHING WITH CHANGING DYNAMIC REFRESH RATE

CROSS-REFERENCE TO RELATED APPLICATIONS

The present application is a continuation of U.S. application Ser. No. 13/594,548, filed Aug. 24, 2012, now U.S. Pat. No. 8,884,977, which is incorporated by reference herein.

TECHNICAL FIELD

This disclosure relates generally to video data, and, more specifically, to enabling power savings by reducing a refresh rate while a displayed image remains static.

BACKGROUND

A DisplayPort communication standard is an interface and link protocol for transferring high definition video/audio and data across computer systems and electronics devices. Video Electronics Standards Association (VESA) has defined various versions of DisplayPort communication standards, which are incorporated by reference herein, including 1.1, 1.1a and 1.2. A DisplayPort standard defines an interface for connecting a video source, such as a system that generates a media or multimedia signal (i.e., video and/or audio) with a sink device, such as a display that renders the signal in an audio-visual manner.

An Embedded DisplayPort (eDP) standard is a part of the DisplayPort communication standard that defines a standardized display panel interface. VESA has defined various versions of eDP standards, including 1.1, 1.1a, 1.2, and 1.3, which are all incorporated by reference herein. An eDP standard may be used by various internal interface elements such as timing controllers (TCONs) or any other video processing devices of displays, computers, and so forth.

An eDP standard supports advanced power-saving features including the Panel Self Refresh (PSR) function. Specifically, when video data is transferred from a source side to a display, the PSR function enables power saving at the source side when the displayed image remains static for multiple successive video frames. If this is the case, the display locally stores the static image and repeatedly displays it while the source side may be turned off to save power.

While this approach may provide power savings to the source side, the display or corresponding electronics may still experience high power loads regardless of whether the PSR function is enabled or not. Accordingly, there is still a need to improve video data communication and processing so that power savings are provided to both the source side and display side.

SUMMARY

Various embodiments provide a system and method for video data processing. The video data may be transferred from a video source, such as a graphics processing unit, processor, computer, set-top box, portable communication device (e.g., a cellular phone), gaming console, and so forth, to a display unit such as a liquid crystal display (LCD). In certain embodiments, the display unit is embedded within the video source so that they construct a single system or apparatus. The video data may be transmitted to the display unit in accordance with a DisplayPort standard or, more specifically, eDP standard, and may include sequences of video frames. The video data transmitted may also include various auxiliary characteristics such as a refresh rate (i.e., the number of times in a second that the display unit draws the video data it is given. A typical refresh rate for a LCD is about 60 Hz. Accordingly, when the display unit receives video data, the display unit may retrieve the video frames and the refresh rate so that the received video frames are displayed at a specific refresh rate as determined.

According to various embodiments, the video source generates a command to enter into a power economy mode (also known as a PSR function) when the video data to be displayed includes a static image (i.e., a number of successive same video frames). Upon receipt of the command to enter into the power economy mode, the display unit selectively stores one of the received video frames (e.g., the last received video frame) in a buffer. Further, the display unit may notify the video source that the display unit has successfully switched into the power economy mode. The video source may then stop transmission of the video data to be displayed, while the display unit continues repeatedly displaying the stored video frame so that a static image is generated. The display unit may further dynamically adapt the refresh rate of the repeatedly displayed video frame. In particular, the refresh rate may be reduced down (e.g., from 60 Hz down to 40 Hz) so that the image quality is not changed, while the power consumption is reduced for both sides (i.e., the video source does not generate any video stream, and the display unit generates video at the lower refresh rate).

Further, the display unit may receive a command to enter a normal power mode from the video source. In response to the command to enter the normal power mode, the display unit starts receiving streaming video frames and displaying the received video frames at the normal refresh rate. The buffer may also be emptied.

According to various embodiments, the system for video data processing includes, among other things, a timing controller, a buffer, a display driver, a video data receiver, a receiver (e.g., multi-phase locked loop receiver), and an oscillating unit. The timing controller may be configured to receive video data from the video source for further processing and displaying. The video data may comprise a sequence of video frames to be displayed at a first refresh rate. The timing controller may also be configured to selectively store a video frame of the sequence of video frames in the buffer (e.g., the last video frame may be stored in the buffer). The timing controller may also be configured to enable a display to repeatedly display the video frame at a second refresh rate. The display may be a standalone device or may be integrated with the system for video data processing. The display driver may be configured to process the video data on a physical level to enable the video data to be displayed on a display. The receiver may be configured to extract a first clock signal defining the first refresh rate and supply the first clock signal to the timing controller, while the oscillating unit may be configured to generate a second clock signal defining the second refresh rate and supply the second clock signal to the timing controller. In further embodiments, there is provided a controller-readable medium comprising instructions, which when implemented by the timing controller performs operations of the above method for video data processing.

These and other features, examples, and embodiments are described below with reference to figures.

DETAILED DESCRIPTION

Figure 1:
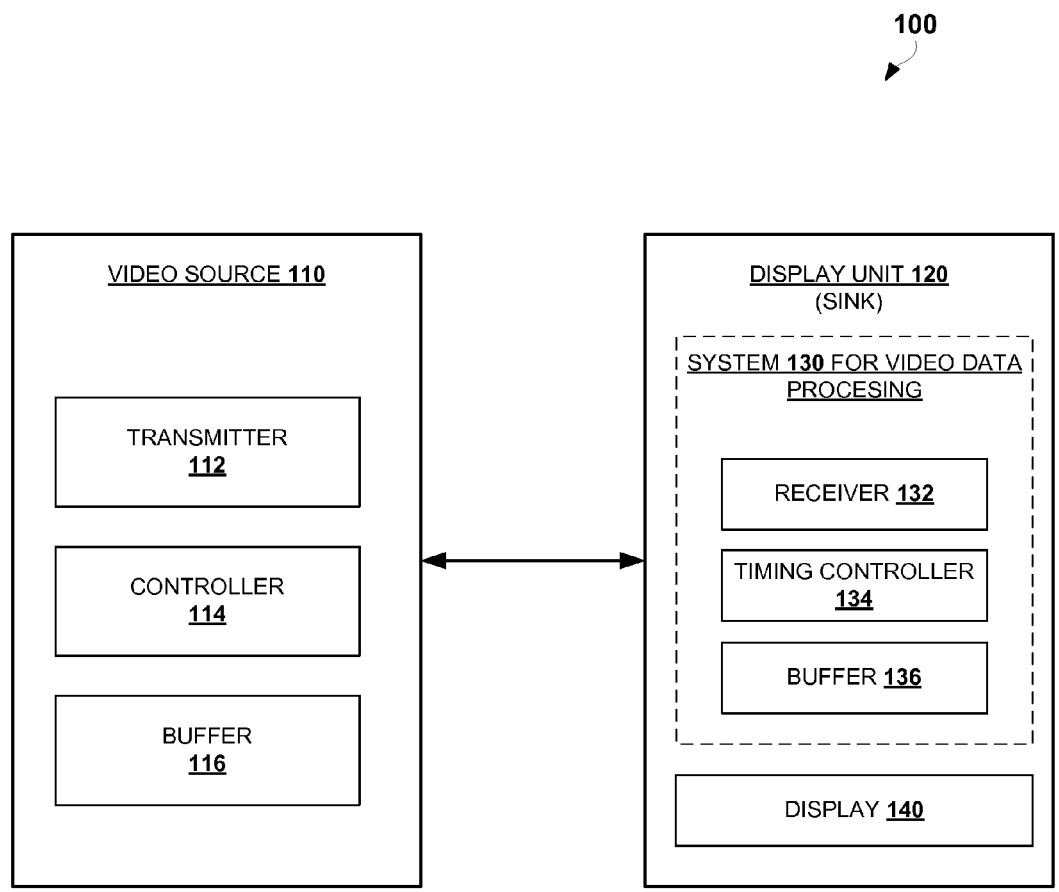
FIG. 1 shows an example block diagram illustrating a system environment suitable for implementing methods for video data processing.

The described technology includes a system and a corresponding method for video data processing. This technology takes advantage of eDP standards and is built on top of it without the need to make any hardware changes in existing systems. The described methods may be used in a number of various electronic systems, which may transfer video data from a video source to a display unit (also known as a "sink" or "panel"). The video source may be selected from a group consisting of: a graphics processing unit, processor, controller, microprocessor, microcontroller, computer (e.g., a laptop computer, tabletop computer, tablet computer, server, and workstation), set-top box, portable communication device (e.g., a cellular phone, smart phone), personal digital assistant (PDA), gaming console, and so forth. The display unit may refer to a flat panel display such as a LCD, plasma panel, electroluminescent display (ELD), volatile display including field emission display (FED), electronic paper (e-ink) display, light emission diode (LED) display, organic light-emitting diode (OLED), interferometric modulator display (IMOD), active-matrix liquid crystal display (AMLCD), quantum dot display (QLED), surface-conduction electron-emitter display (SED), and so forth. In certain embodiments, the video source and display unit are separate devices; while in other embodiments, the video source and display unit are integrated into a single standalone system or apparatus.

The video source may transmit video data to the display unit for further displaying on its screen. The video data may include a sequence of video frames and various auxiliary characteristics, such as a refresh rate. The refresh rate relates to a number of times in a second or other time period that the display unit draws the video frames provided to it. A typical refresh rate for a LCD is 60 Hz. Accordingly, when the display unit receives the video data, the display unit may retrieve the video frames and corresponding refresh rate associated thereto so that the received video is displayed at the specified refresh rate.

According to various embodiments, the video source enables a Panel Self Refresh in Dynamic Refresh Rate Changing (PSR-DRRC) feature when the video data to be displayed includes the same video frames over a period of time (i.e., the video data includes a static image). PSR-DRRC feature may provide great power savings for both the video source and the display unit. In addition, the power savings could be dynamically adjusted to not cause any visual artifacts. The PSR-DRRC feature may be activated by the video source by generating a certain command for the display unit that causes the display unit to selectively store one of the recently received video frames (e.g., the last received video frame) in a buffer. Further, the stored video frame may be repeatedly displayed by the display unit at a lower refresh rate, while the video source is powered down and does not transmit any new video data. The refresh rate for the displayed video frame may be dynamically updated so that there are no visual artifacts or distortions, but power savings are achieved.

It was shown that the power consumption of the display unit is sensitive to the refresh rate. For example, when a LCD is used in the display unit to display video frames, the LCD needs to be controlled by a voltage that is used for charging multiple capacitive elements associated with the pixels. In certain LCDs, every pixel capacitive element is charged once per video frame. When the refresh rate is 60 Hz every pixel capacitive element is charged every 16.67 ms. However, when the refresh rate is 50 Hz, every pixel capacitive element will be charged every 20 ms. It should be understood by an ordinary person skilled in the art that the longer the re-charging period for pixel capacitive elements, the less energy is consumed by the LCD. In some embodiments, for example, the decrease of the refresh rate from 60 Hz down to 50 Hz decreases power consumption by about 16%.

On the other hand, due to the leakage current of pixel capacitive elements, any changes in the charging period may impact LCD performance. If the charging period is excessively long (or the refresh rate is too low), images generated onto the LCD may be dark compared to the normal operation. However, experiments have shown that human eyes cannot grasp any changes in displayed video when the refresh rate is changed, for example, from 60 Hz to 40 Hz. Accordingly, the present technology described herein takes advantage of reducing the refresh rate to reduce power consumption when PSR-DRRC is enabled. The experiments demonstrated that the PSR-DRRC feature may decrease the power consumption of the display unit by about 10-20%. It should also be mentioned that the PSR-DRRC feature may be enabled for any devices working on an eDP standard without any hardware modification, which makes it easy to integrate into existing systems.

Referring now to the drawings, FIG. 1 shows an example block diagram illustrating a system environment 100 suitable for implementing methods for video data processing. In the example shown, the system environment 100 represents an interface for video data transfer between a video source 110 and a display unit 120. In certain embodiments, the video data transfer corresponds to DisplayPort standard and/or the aforementioned eDP standard. Accordingly, the system environment 100 may operate under DisplayPort or eDP standards.

The video source 110 may be any video processing device, including a graphics processing unit, processor, controller, computer, set-top box, portable communication device, and so forth. The display unit 120 (which is also known as "sink" according to eDP standard) may refer to a flat panel display (for example, a LCD or any suitable volatile display). In certain embodiments, the video source 110 and display unit 120 are separate devices; while in other embodiments, the video source 110 and display unit 120 are part of a single system or apparatus.

The video source 110 may include a transmitter 112, controller 114, and buffer 116. In general, the video source 110 may be configured to generate and/or process video data comprising multiple successive video frames. The video data to be displayed may be processed by the controller 114, stored in the buffer 116, and then transmitted to the display unit 120 by the transmitter 112. The controller 114 may also generate specific commands for the display unit 120, which are also transmitted by the transmitter 112.

The display unit 120 may be configured to receive video data from the video source 110, process it, and display it on its screen. The display unit 120 may include a system 130 for video data processing, which may include a receiver 132, a timing controller (TCON) 134, and a buffer 136. The display unit 120 may further include a display 140 such as a LCD. The receiver 132 is configured to receive video data sent by the video source 110 and provide the video data to the timing controller 134 for further processing. The buffer 136 may be used for temporary storage of the video frames and other video data or video data parameters. For example, the buffer 136 may store the last received video frame so that the last received video frame may then be repeatedly displayed.

It should be also mentioned that the timing controller 134 may also generate specific notifications for the video source 110. Accordingly, the display unit 120 may also be provided with a transmitter (not shown) for communicating the notification to the video source 110, while the video source 110 may also include a receiver (not shown) for receiving the display unit notifications. In other words, bidirectional communication may be established between the video source 110 and the display unit 120.

Figure 2:
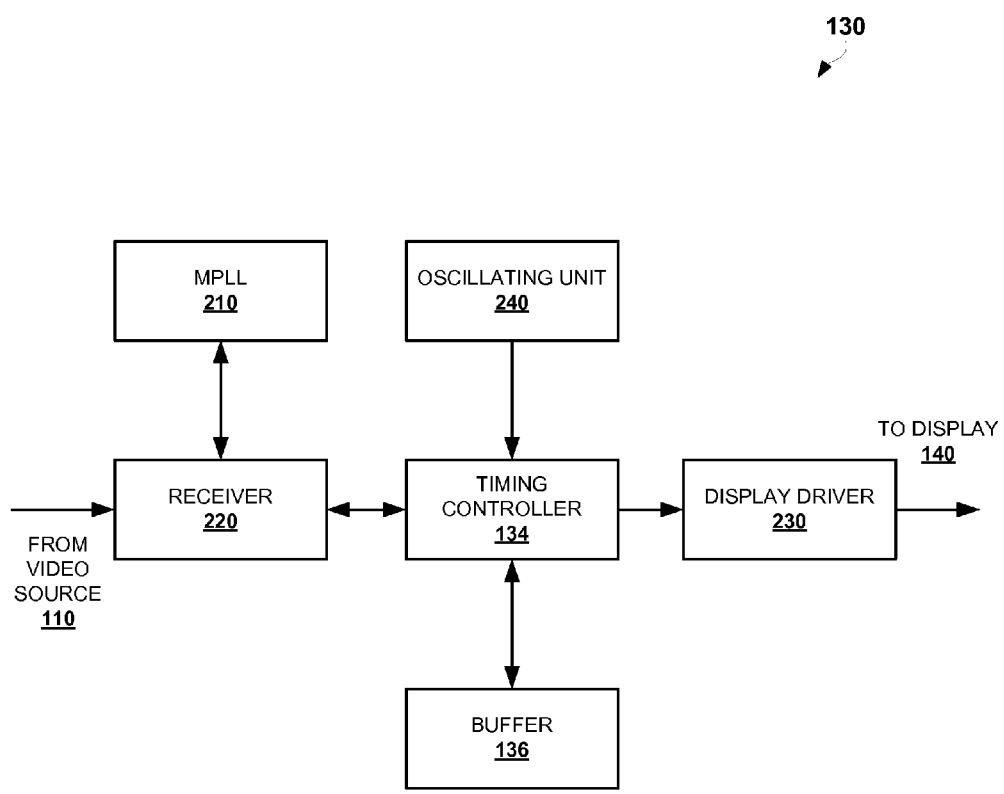
FIG. 2 shows an example embodiment of a system for video data processing.

FIG. 2 shows an example embodiment of the system 130 for video data processing. In the shown example, the system 130 for video data processing may include Multi-Phase Lock Loop (MPLL) 210, receiver 220, timing controller 134, buffer 136, display driver 230, and oscillating unit 240. It should be mentioned that all of these modules/units may be integrated within a single apparatus, or, alternatively, may be remotely located and optionally accessed via a third party. It will be appreciated by one of ordinary skill in the art that examples of some or all of the foregoing modules/units may be virtual, and instructions said to be executed by a module/unit may, in fact, be retrieved and executed by a processor (embedded processor). The system 130 for video data processing may further include additional modules/units, but the disclosure of such modules is omitted so as not to burden the entire description of the present teachings.

The receiver 220 may be configured to receive video data from the video source 110. The receiver 220 may include a Low Voltage Differential Signaling (LVDS) receiver or the like unit. MPLL 210 may be configured, in general, to derive a phase of the input signal related to the video data and adjust an internal oscillator at frequencies matching the frequencies of the input signal. MPLL 210 may generate multi-phase clock signals for the receiver 220. The receiver 220 may further transmit video data to the timing controller 134.

The buffer 136 may be used to store various video data or various operation parameters. The timing controller 134 may be configured to retrieve various parameters of received video data. For example, the timing controller 134 may retrieve a refresh rate at which the video frames are to be displayed. The timing controller 134 may be further configured to process video data and do all operations necessary for displaying the video data on the display 140. The video data may be displayed at the refresh rate as retrieved from the input signal.

The timing controller 134 may be further configured to implement video data processing steps necessary for implementing PSR-DRRC feature. In particular, once the timing controller 134 receives a command to enter a power economy mode (i.e., PSR-DRRC feature) generated by the video source 110, the timing controller 134 selectively stores one or more video frames in the buffer 136. In an example embodiment, the timing controller 134 stores the last received video frame. Further, the timing controller 134 may notify the video source 110 that the display unit 120 is ready to start or has successfully started the power economy mode. In response, the video source 110 may power down and stop sending the video data to be displayed. The timing controller 134 may then cause the display 140 to repeatedly display the video frame stored in the buffer 136 so as to generate a static image on the screen. The timing controller 134 may also return to the normal power mode when a corresponding command is received, for example, from the video source 110. When such a command is received by the timing controller 134, the timing controller 134 starts accepting video data from the video source 110 and causes it to be displayed on the display 140. In certain embodiments, the timing controller 134 also generates a corresponding notification for the video source 110 informing that the display unit 120 is in the normal power mode.

The timing controller 134 may also be responsible for performing timing re-synchronization for the video data to be displayed. In other words, the timing for the video data to be displayed is locally controlled by the timing controller 134. When the display unit 120 switches between the power economy mode and normal power mode, the timing controller 134 may ensure that there are no visual artifacts at the display screen and that the video data is displayed without interruptions or any other artifacts or distortions.

The display driver 230 may be configured to allow high-level data processing algorithms as used, for example, in the timing controller 134 to interact with hardware of display 140. In other words, the display driver 230 enables the display 140 and the timing controller 134 to generate images associated with video frames by the timing controller 134. In addition to the display driver 230, or instead of it, there may be a graphics processing unit or controller, which may be used for any other video data processing.

The oscillating unit 240 may be configured to generate a clock signal for the timing controller 134, thereby defining the refresh rate of the video frames to be displayed via the display 140. In particular, the oscillating unit 240 may be configured to generate corresponding pixel clock frequency, horizontal frequency, and vertical frequency (also known as "refresh rate"). The oscillating unit 240 may be in communication with the timing controller 134 and may set a specific refresh rate for displayed video data depending on the current operation mode (i.e., power economy mode or normal power mode). For example, the oscillating unit 240 may set the refresh rate of 60 Hz when the display unit 120 is in the normal power mode, and to 50 Hz or 40 Hz when the display unit 120 is in the power economy mode. As mentioned, a lower refresh rate results in a lower power consumption by the display unit 120 or specific modules of the display unit 120. A transition between the first, original refresh rate and the second, lower refresh rate for a displayed video may be seamless and without any obvious visual artifacts. Table 1 below shows various parameters associated with one video format (1280× 800) but having different example refresh rates.

TABLE 1

| Parameter | Refresh rate | | | Units |
| --- | --- | --- | --- | --- |
| | 60 Hz | 50 Hz | 40 Hz | |
| Pixel Clock | 71.00 | 59.167 | 47.33 | MHz |
| Horizontal Active | 1280 | 1280 | 1280 | Pixels |
| Horizontal Blank | 160 | 160 | 160 | Pixels |
| Horizontal Front Porch | 48 | 48 | 48 | Pixels |
| Horizontal Sync | 32 | 32 | 32 | Pixels |
| Horizontal Back Porch | 80 | 80 | 80 | Pixels |
| Vertical Active | 800 | 800 | 800 | Lines |
| Vertical Blank | 23 | 23 | 23 | Lines |
| Vertical Front Porch | 3 | 3 | 3 | Lines |
| Vertical Sync | 6 | 6 | 6 | Lines |
| Vertical Back Porch | 14 | 14 | 14 | Lines |

According to various embodiments, the change between different refresh rates is implemented by changing vertical blanking periods (or VBLANK). The vertical blanking period is the time difference between the last generated line of one video frame and the beginning of the first line of the next video frame. Various vertical blanking period control techniques may be used. In an example, "Gapless Technology" may be used to control vertical blanking intervals so that the refresh rate is dynamically changed. Gapless Technology is disclosed in the U.S. utility patent application Ser. No. 13/461,761, titled "Transfer of Uncompressed Multimedia Contents and Data Communications," filed on May 1, 2012, which is incorporated by reference herein in its entirety.

Figure 3A:
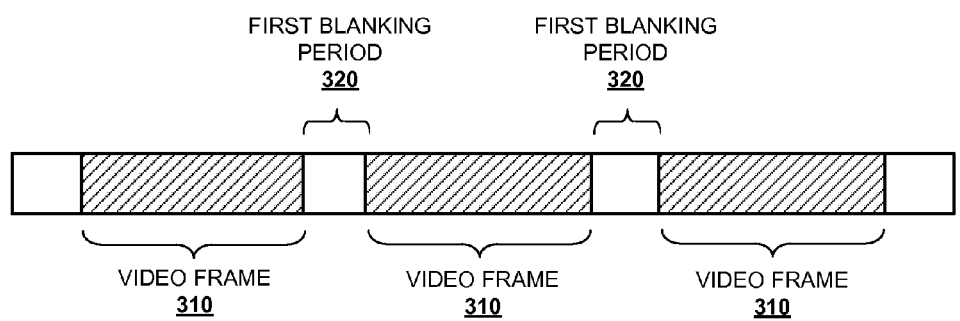
FIGS. 3A and 3B show simplified block diagrams of example video frame sequences having different refresh rates.
Figure 3B:
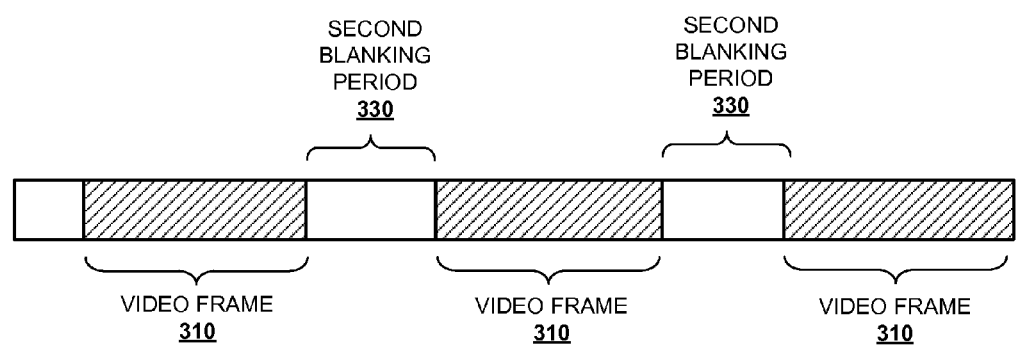

FIGS. 3A and 3B show simplified block diagrams of example video frame sequences having different refresh rates. In particular, FIG. 3A is a block diagram of an example sequence of video frames 310 supplied to the display 140 in the normal power mode. As shown in the figure, there is a first blanking period 320 between each video frame 310. When the display unit 120 enters the power economy mode, the refresh rate for repeatedly displayed video frames may be decreased or, in other words, the blanking period is increased. Accordingly, as shown in FIG. 3B, a second blanking period 330 between each video frame 310 is larger that the first blanking period 320.

Figure 4:
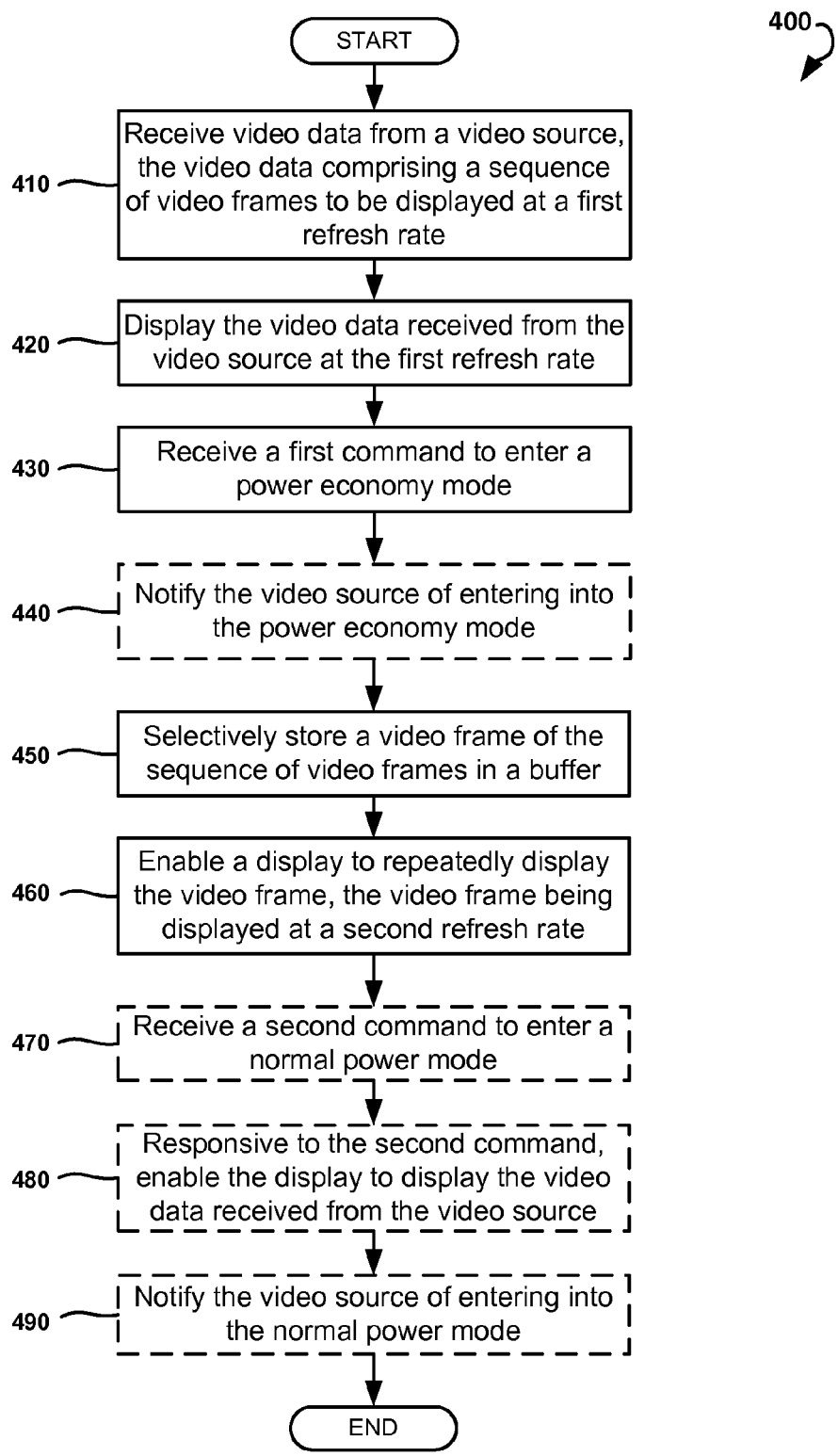
FIG. 4 is a process flow diagram showing an example method for video data processing.

FIG. 4 is a process flow diagram showing an example method 400 for video data processing. The method 400 may be performed by processing logic that may comprise hardware (e.g., dedicated logic, programmable logic, and microcode), software (such as software run on a general-purpose computer system or a dedicated machine), or a combination of both. In example embodiments, the processing logic resides at the system 130 for video data processing. Each of these modules may comprise processing logic. It will be appreciated by one of ordinary skill in the art that examples of the foregoing modules may be virtual, and instructions said to be executed by a module may, in fact, be retrieved and executed by a processor. The foregoing modules may also include memory cards, servers, and/or computer discs. Although various modules may be configured to perform one or more steps described herein, fewer or more modules may be provided and still fall within the scope of various embodiments.

As shown in FIG. 4, the method 400 may commence at operation 410 with the timing controller 134 receiving video data from the video source 110. The video data may comprise a sequence of video frames to be displayed on the display 140 at a first refresh rate. As mentioned, the first refresh rate may be retrieved from the video data by the receiver 220. At operation 420, the timing controller 134 causes the display 140 to display the received video frames at the first refresh rate.

At operation 430, the timing controller 134 may receive from the video source 110 a first command to enter a power economy mode. In response, at operation 440, the timing controller 134 may optionally generate a notification and send the notification back to the video source 110 to inform that the display unit 120 was successfully entered into the power economy mode. Further, at operation 450, the timing controller 134 may selectively store one or more video frames of previously received video frames in the buffer 136. For example, the timing controller 134 may store the last received video frame. At this point, the video source 110 may stop sending video data to the display unit 120.

At operation 460, the timing controller 134 enables the display 140 to repeatedly display the video frame stored in the buffer 136, thereby generating a static image on the display 140. It is important to note that the video frame is displayed at a second refresh rate, which is selected to decrease power consumption by the display unit 120, while keeping the quality of the display the same. The second refresh rate may be dynamically set by the oscillating unit 240.

At operation 470, the timing controller 134 may optionally receive from the video source 110 a second command to enter a normal power mode. If this is the case, at operation 480, the timing controller 134 starts receiving new video data from the video source 110 and enables the display 140 to display the new video data. At optional operation 490, the timing controller 134 may notify the video source 110 that the timing controller 134 has successfully entered into the normal power mode, at which the video is again displayed at the first refresh rate.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for video data processing, the method comprising:
    deriving a phase of an input signal related to video data from a video source and adjust an internal oscillator to match a frequency of the input signal;
    generating multi-phase clock signals and supply the multi-phase clock signals to a receiver;
    receiving the video data from the receiver, the video data comprising a sequence of video frames to be displayed at a first refresh rate;
    selectively storing one or more video frames of the sequence of video frames in a buffer; and
    causing a display to repeatedly display the one or more video frames, the one or more video frames being displayed at a second refresh rate lower than the first refresh rate, a transition from the first refresh rate to the second refresh rate avoiding visual artifacts.

2. The method of claim 1, further comprising receiving a first command to enter a power economy mode.

3. The method of claim 2, further comprising notifying the video source of entering into the power economy mode.

4. The method of claim 2, further comprising:
    receiving a second command to enter a normal power mode; and
    responsive to the second command, causing the display to display second video data received from the video source.

5. The method of claim 4, further comprising notifying the video source of entering into the normal power mode.

6. The method of claim 2, wherein the first command to enter into the power economy mode is received when the video data comprises static video data.

7. The method of claim 1, wherein the video frame selected from the sequence of video frames is a last video frame in the sequence of video frames.

8. The method of claim 1, wherein the first refresh rate is 60 Hz, and the second refresh rate is either 50 Hz or 40 Hz.

9. The method of claim 1, wherein the first refresh rate is 50 Hz and the second refresh rate is 40 Hz.

10. The method of claim 1, wherein causing the display to repeatedly display the one or more video frames comprises repeatedly sending the one or more video frames to one or more of the following: the display, a display driver, a controller, and a graphics processing unit.

11. The method of claim 1, further comprising displaying the video data, wherein the transition from the first refresh rate to the second refresh rate is seamless for a viewer.

12. The method of claim 1, wherein the video data is transmitted in accordance with a DisplayPort standard.

13. The method of claim 1, wherein the method is implemented within a digital display interface in accordance with an Embedded DisplayPort (eDP) standard.

14. A system for video data processing, the system comprising:
a multi-phase lock loop configured to:
derive a phase of an input signal related to video data from a video source and adjust an internal oscillator to match a frequency of the input signal; and
generate multi-phase clock signals and supply the multi-phase clock signals to a receiver;
a buffer configured to store video frames; and
a timing controller configured to:
i) receive the video data from the receiver, the video data comprising a sequence of video frames to be displayed at a first refresh rate;
ii) selectively store one or more video frames of the sequence of video frames in the buffer; and
iii) cause a display to repeatedly display the one or more video frames, the one or more video frames being displayed at a second refresh rate lower than the first refresh rate, a transition from the first refresh rate to the second refresh rate avoiding visual artifacts.

15. The system of claim 14, further comprising a display driver configured to process the video data on a physical level to cause the video data to be displayed on the display.

16. The system of claim 14, wherein the receiver is a video data receiver configured to receive one or more of the following: the video data, a first command to enter a power economy mode, and a second command to enter a normal power mode.

17. The system of claim 14, a wherein the receiver is configured to extract a first clock signal defining the first refresh rate and supply the first clock signal to the timing controller.

18. The system of claim 14, further comprising another oscillating unit configured to generate a second clock signal defining the second refresh rate and supply the second clock signal to the timing controller.

19. A non-transitory computer-readable medium having instructions stored thereon, wherein the instructions when executed by a computer, cause the computer to:
derive a phase of an input signal related to video data from a video source and adjust an internal oscillator to match a frequency of the input signal;
generate multi-phase clock signals and supply the multi-phase clock signals to a receiver;
receive the video data from the receiver, the video data comprising a sequence of video frames to be displayed at a first refresh rate;
selectively store one or more video frames of the sequence of video frames in a buffer; and
cause a display to repeatedly display the one or more video frames, the one or more video frames being displayed at a second refresh rate lower than the first refresh rate, a transition from the first refresh rate to the second refresh rate avoiding visual artifacts.

* * * * *